United States Patent
Pettersson

(10) Patent No.: US 7,955,056 B2
(45) Date of Patent: Jun. 7, 2011

(54) METHOD FOR CONTROLLING A COMPRESSED AIR INSTALLATION COMPRISING SEVERAL COMPRESSORS, CONTROL BOX APPLIED THEREBY AND COMPRESSED AIR INSTALLATION APPLYING THIS METHOD

(75) Inventor: Johan Georg Urban Pettersson, Tervuren (BE)

(73) Assignee: Atlas Copco Airpower, Naamloze Vennootschap, Wilrijk (BE)

( * ) Notice: Subject to any disclaimer, the term of this patent is extended or adjusted under 35 U.S.C. 154(b) by 1377 days.

(21) Appl. No.: 10/551,757

(22) PCT Filed: Apr. 1, 2004

(86) PCT No.: PCT/BE2004/000048
§ 371 (c)(1),
(2), (4) Date: Jun. 30, 2006

(87) PCT Pub. No.: WO2004/088140
PCT Pub. Date: Oct. 14, 2004

(65) Prior Publication Data
US 2006/0257265 A1    Nov. 16, 2006

(30) Foreign Application Priority Data
Apr. 4, 2003   (BE) .................................. 2003/0215

(51) Int. Cl.
*G05D 16/00* (2006.01)
*F01D 17/08* (2006.01)

(52) U.S. Cl. ........... 417/53; 417/2; 417/3; 417/4; 417/5; 417/7; 417/287; 417/426; 700/282; 702/182

(58) Field of Classification Search .................. 417/286, 417/287, 288, 426, 1–8; 700/282; 702/182
See application file for complete search history.

(56) References Cited

U.S. PATENT DOCUMENTS

| | | | |
|---|---|---|---|
| 4,325,223 A * | 4/1982 | Cantley | 62/126 |
| 4,502,842 A | 3/1985 | Currier et al. | |
| 7,600,981 B2 * | 10/2009 | Lau | 417/5 |
| 2003/0039550 A1 | 2/2003 | Wichert | |

FOREIGN PATENT DOCUMENTS

| | | |
|---|---|---|
| BE | 1 011 122 A | 5/1999 |
| JP | 11-303792 | 11/1999 |
| JP | 11-343986 | 12/1999 |

OTHER PUBLICATIONS

Examination Report of Japanese Patent Office regarding Japanese Patent Application No. 2006-504040, Apr. 14, 2009.

* cited by examiner

*Primary Examiner* — Devon C Kramer
*Assistant Examiner* — Philip Stimpert
(74) *Attorney, Agent, or Firm* — Bacon & Thomas, PLLC

(57) ABSTRACT

Method for adjusting a compressed air installation using several electrically driven compressors of what is called the "loaded/unloaded" type and/or the turbo compressor type and/or the compressor type with variable rotational speed, wherein these compressors are each connected to a single compressed air network with their outlets, and wherein use is made of a control box which makes it possible to adjust the pressure in the compressed air network around a target pressure to be set. The adjustment takes place by controlling the flow of one or several of the compressors, in particular in order to increase the overall flow supplied by the compressors when the pressure drops too much, and in order to lower the overall supplied flow when the pressure becomes too high.

11 Claims, 3 Drawing Sheets

METHOD FOR CONTROLLING A COMPRESSED AIR INSTALLATION COMPRISING SEVERAL COMPRESSORS, CONTROL BOX APPLIED THEREBY AND COMPRESSED AIR INSTALLATION APPLYING THIS METHOD

BACKGROUND OF THE INVENTION

A. Field

The present invention concerns a method for controlling a compressed air installation comprising several compressors.

B. Related Technology

Such compressed air installations comprising several compressors are already known, whereby one or two different types of compressors at the most are combined, which compressors are connected to a single compressed air network with their respective outlets and which are switched on and off in cascade, each at a different switching pressure in order to prevent that several compressors would be switched on and off simultaneously, which would result in enormous fluctuations in the compressed air network.

Such a method for controlling the compressors in a compressed air installation comprising several compressors is disadvantageous in that the overall flow and the pressure in the compressed air network may nevertheless still undergo large fluctuations.

A related disadvantage is that, due to the large pressure fluctuations in the compressed air network, the average pressure is relatively large in relation to the required minimum pressure, which results in a large consumption of energy and in larger leakage losses in the compressed air network.

Another disadvantage of the known method is that the above-mentioned control does not take the optimal working conditions of every separate compressor into account, and that the compressors often operate outside their optimal working domain, where they consume much more energy, comparatively speaking, and wear much faster.

Another disadvantage is that switching the compressors on and off each time is disadvantageous to the power consumption and to the life span of the compressors concerned.

BRIEF SUMMARY OF THE INVENTION

An additional disadvantage is that such a method is not suitable for combining more than two different types of compressors in a single compressed air installation.

The present invention aims to provide a solution to the above-mentioned and other disadvantages by providing a method which makes it possible to control a compressed air installation with one, two or three different types of compressors in order to obtain a pressure adjustment around an average set value and within a very narrow margin between a set minimum pressure and a set maximum pressure, such that the average pressure is situated relatively close to the minimum pressure, which is advantageous to the energy consumption and the losses of air via leaks in the compressed air installation.

To this end, the invention concerns a method for adjusting a compressed air installation with several compressors, which compressed air installation mainly consists of two or more electrically driven compressors of what is called the 'loaded/unloaded' compressor type and/or of the turbo compressor type and/or of the compressor type with variable rotational speed, whereby these compressors are connected to a single compressed air network with their outlets, and whereby each compressor is provided with one or several control units, whereby the method makes use of a control box onto which is connected a pressure sensor of the above-mentioned compressed air network, which control box makes it possible to adjust the pressure in the above-mentioned compressed air network around a target pressure to be set and within a pressure interval which is limited by a minimum pressure to be set and a maximum pressure to be set, whereby the above-mentioned adjustment takes place by controlling the flow of one or several of the above-mentioned compressors, in particular in order to increase the overall flow supplied by the compressors when the pressure drops too much and in order to lower the overall supplied flow when the pressure becomes too high.

Preferably, an evaluation table is stored in the memory of the control box beforehand for every compressor or for every type of compressor of the compressed air installation, whereby for every working condition of the compressor concerned, the influence of an aforesaid control order is assessed, and whereby for every control order of the compressor concerned, a score is given which is positive when the influence of said order is advantageous to the output of the compressed air installation, and which is negative when the aforesaid influence is disadvantageous and whose absolute value is all the greater as the advantageous or disadvantageous influence is bigger.

In this manner, on the basis of said evaluation table, it is possible to check what control order has the highest score at any time as far as output of the compressed air installation is concerned, and it is possible to determine this best score by means of an algorithm, and to have the corresponding control order carried out by the control box.

The invention also concerns a control box for adjusting a compressed air installation comprising one or several compressors according to the method of the invention, which control box is mainly provided with connections to one or several control units of the compressors and with a pressure sensor of the compressed air installation; a memory in which can be stored an evaluation table with scores to be inputted by the user; an arithmetic unit with an algorithm which makes it possible to compare the aforesaid scores and to give a control order as a function of the highest selected score.

Moreover, the invention also concerns a compressed air installation applying the method according to the invention and which mainly consists of one or several compressors of what is called the 'loaded/unloaded' type; one or several compressors of the turbo compressor type; one or several compressors of the type with a variable rotational speed, whereby these compressors are each connected to a single compressed air network with their outlets, and whereby each compressor is provided with one or several control units and a pressure sensor; and finally a control box which is connected to one or several of the above-mentioned control units and to the above-mentioned pressure sensor.

Such a compressed air installation with three different types of compressors offers the advantage that the pressure and the output can be adjusted very precisely.

In order to better explain the characteristics of the invention, two preferred compressed air installations according to the invention are described as an example only without being limitative in any way, as well as a preferred application of the method according to the invention, with reference to the accompanying drawings, in which:

DETAILED DESCRIPTION OF THE PREFERRED EMBODIMENTS OF THE INVENTION

Figure 1:
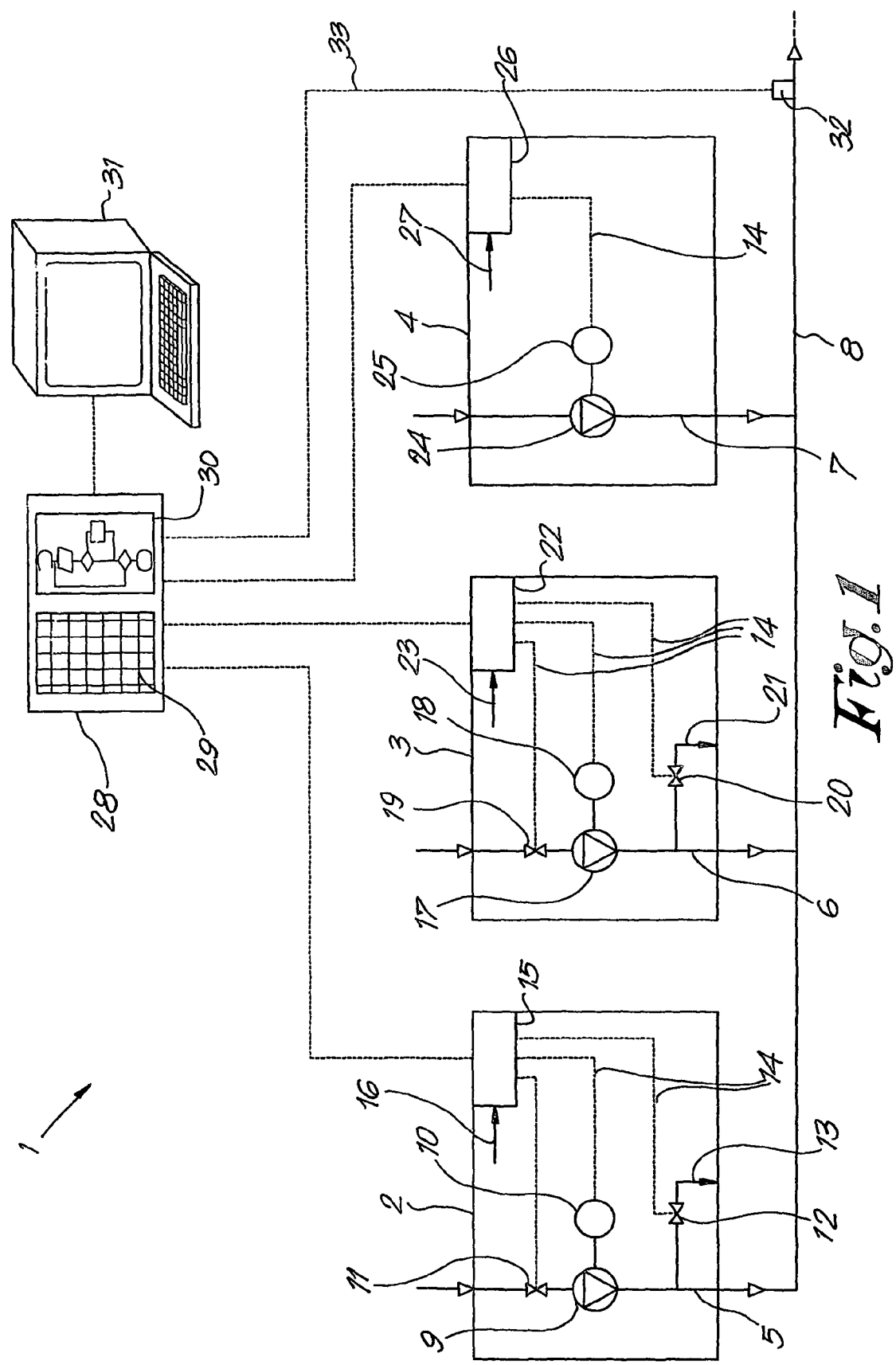
FIG. 1 schematically represents a compressed air installation comprising several compressors which makes it possible to apply the method according to the invention.

In FIG. 1, a compressed air installation 1 is represented by way of example comprising three different compressors, in particular a first compressor 2 of the 'loaded/unloaded' type, a second compressor 3 of the turbo type and a third compressor 4 of the type with a variable rotational speed, whereby these compressors are connected to a single compressed air network 8 with their respective outlets 5-6-7.

The compressor 2 of the 'loaded/unloaded' type in this case consists of a compressor element 9 which is coupled to an electric motor 10.

In the inlet of the compressor element 9 is provided a controlled inlet valve 11 with an open and a closed position, whereas a controlled exhaust valve 12 is provided in the exhaust 5 with an outlet 13 which opens into the ambient air.

The motor 10, the inlet valve 11 and the exhaust valve 12 are connected to a control element 15 by means of electric conductors 14 which can give control orders to start the motor 10 and to stop it, and to open and close the inlet valve 11 and to put the exhaust valve 12 in a specific position in order to make the compressor work in a loaded, respectively unloaded manner.

This compressor 2 has three possible operational modes, namely standstill, loaded and unloaded operation.

The control element 15 receives a number of signals 16 from certain probes and meters which are not represented in the figures for clarity's sake and which measure for example the rotational speed, the electric power absorbed by the motor 10, the pressure and the temperature at the outlet 5 and the like.

The turbo type compressor 3 consists of a compressor element 17 which is coupled to an electric motor 18.

In the inlet of the compressor 3 is provided a controlled inlet valve 19 having an open and a closed position, whereas an exhaust valve 20 is provided in the outlet 6 having a free exit 21 in the ambient air.

The compressor 3 is provided with a control element 22 which is electrically connected to the motor 18 and to the inlet valve 19 and exhaust valve 17 by means of conductors 14, whereby said control element 22 can give the necessary control orders to start and stop the motor 16, to open and close the inlet valve 19 and to put the exhaust valve 20 in a specific position.

Figure 2:
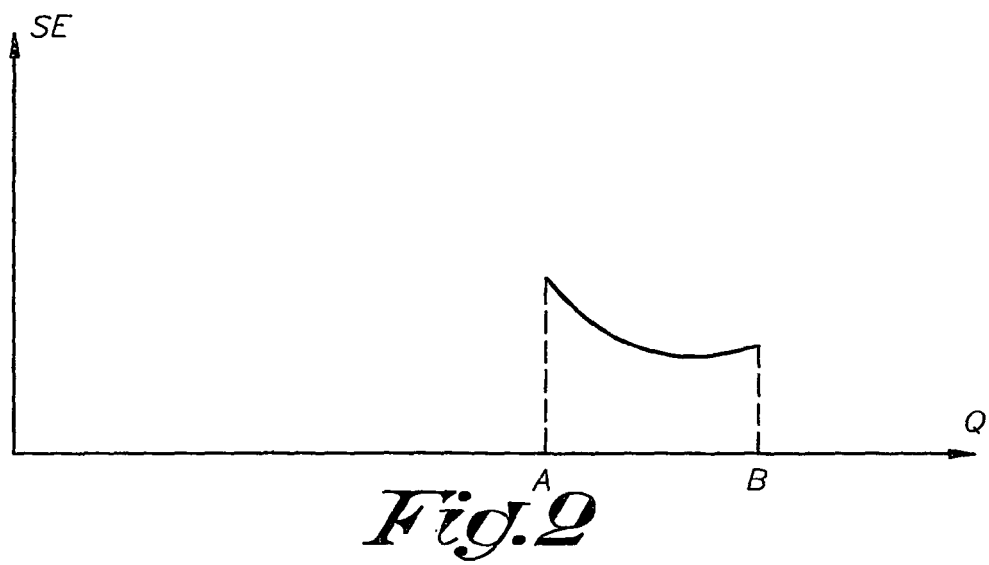
FIGS. 2 and 3 respectively represent the operational curves of the compressors which are indicated by F2 and F3 respectively in FIG. 1.

FIG. 2 represents the operational curve of said compressor 3, which curve represents what is called the specific consumption SE, or in other words the absorbed energy per unit of supplied pneumatic power, as a function of the supplied air flow Q.

The smaller the specific consumption SE, the better the output of the compressor will be.

As is clear from FIG. 2, the compressor 3 can operate between two utmost operational points A and B, whereby to the left of this operational area A-B, the exhaust valve 20 is open, whereas inside the operational area A-B the flow is determined by the position of the inlet valve 19.

In an analogous manner as the control element 15, the control element 22 is provided with a number of measuring signals 23 related to the rotational speed, absorbed power and the like of the compressor 3.

The compressor 4 of the variable speed type comprises a compressor element 24 which is coupled to an electric motor 25 which is connected to a control element 26 by means of electric conductors 14, provided for example with a frequency control to be able to adjust the rotational speed of the motor 25 in a continuous manner and to be able to start and to stop the motor 25.

Figure 3:
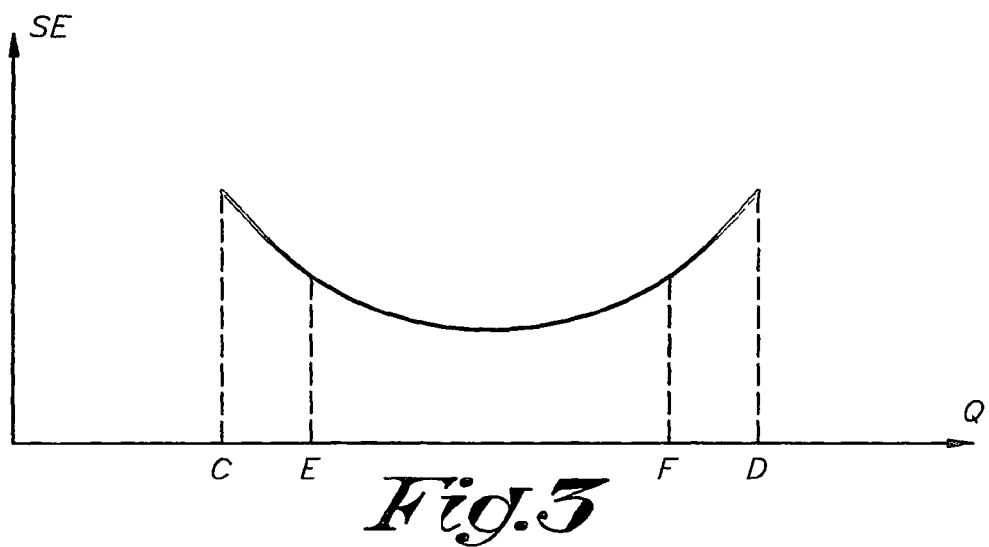

FIG. 3 represents the operational curve of this compressor 4 with a working domain situated between the points C and D, whereby the working points inside this domain C-D can be obtained by controlling the rotational speed of the motor 25.

In practice, the aim is to have the compressor work in the central working zone E-F, where the specific consumption is the lowest and in any case much lower than in the less advantageous working zones C-E and F-D.

The control element 26 receives certain measuring signals 27, such as the rotational speed of the motor 25, the absorbed power and the like.

The compressed air installation 1 is further provided with a control box 28 according to the invention, whereby this control box 28 is connected to the above-mentioned control elements 15, 22 and 2 by means of connections 28 which can be realized by means of electric conductors, by a connection in a local area network (LAN), by a wireless connection or the like.

The control box 28 has a memory 29 and an arithmetic unit 30 and is in this case connected to a computer 31 or the like, whereby this computer 31 can be connected either directly or via a communication network, such as the internet or the like.

In the compressed area network 8 is provided a pressure sensor 32 which is connected to the control box 28 via the connection 33.

The method according to the invention will be explained hereafter by means of a few theoretical examples.

When starting the compressed air installation 1, an evaluation table is established whereby, for all the above-mentioned control orders of the compressors 2-3-4, for all or for certain operational situations, a score is given which is a measure for the influence which said control order has on the output and thus on the energy consumption of the compressed air installation 1, whereby for example a positive score is given for a favorable influence, and a negative score is given for an unfavorable influence, and whereby the score is all the higher as the influence is larger.

Examples of such scores for starting the compressors 2-3-4 are as follows:

score −50 for starting a compressor 2 of the 'loaded/unloaded' type;

score −40 for starting a turbo-type compressor 3;

score −20 for starting a compressor 4 of the variable speed type.

All these scores are negative, which indicates that starting a compressor always has an unfavorable influence on the output, and that starting the compressor 2 is more unfavorable than starting the compressor 3, and even more unfavorable than starting the compressor 4.

An example of a positive score is a score which corresponds to a control order which moves for example the operational point of compressor 4 with a variable rotational speed from the less favorable working zone C-E in FIG. 3 to the more favorable working zone E-F.

The above-mentioned evaluation table is either calculated on the basis of the known characteristics of the compressors 2-3-4 or it is determined in an experimental manner.

This table is stored in the memory 27 of the control box 28.

Figure 4:
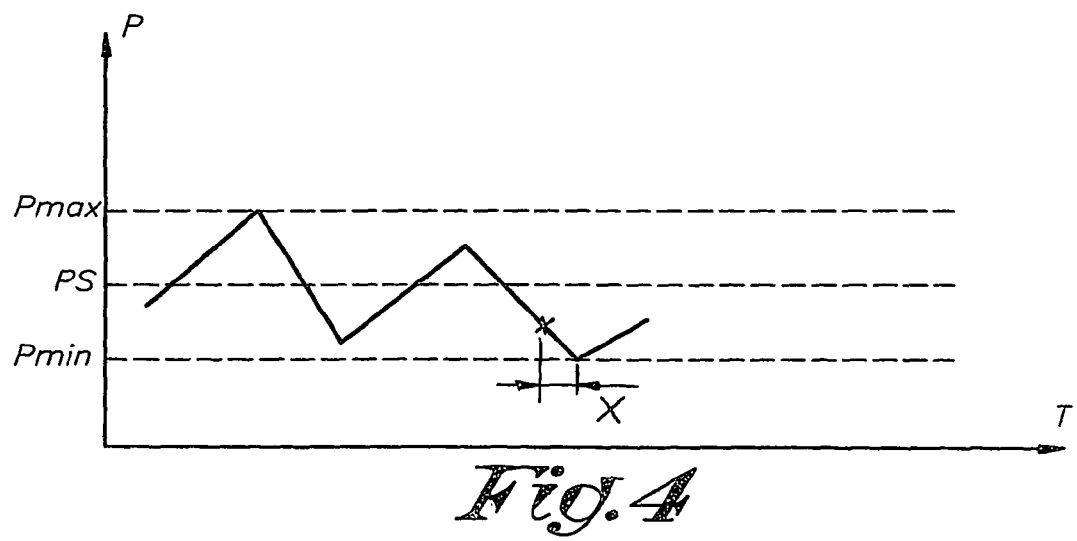
FIG. 4 represents the development of the pressure as a function of time.

When the compressed air installation 1 is operating, as represented in FIG. 4, the pressure in the compressed air network 8, for example the pressure at the pressure sensor 32, is set in relation to a target pressure PS situated within a pressure interval which is limited by a maximum pressure PMAX and a minimum pressure PMIN.

These pressures PS, PMAX and PMIN are set in the control box 28, for example via the computer 31.

The control box 25 provides for the adjustment of the pressure P within the above-mentioned limits by controlling the flow of one or several of the above-mentioned compressors 2-3-4, in particular in order to increase the overall flow supplied by the compressors 2-3-4 when the pressure P drops too much, and to reduce the overall supplied flow when the pressure P rises too much.

Preferably, when the pressure P in the compressed air network 8 rises above the set target pressure PS, the control box 28 will give a control order to increase the flow, a certain length of time X before the set maximum pressure PMAX is reached, and when the pressure in the compressed air network 8 drops below the set target pressure PS, the control box 28 will give a control order to reduce the flow, a certain length of time X before the set minimum pressure PMIN is reached.

Thus, by continuously adjusting the flows of the compressors 2-3-4 is obtained a very precise adjustment of the pressure P in the compressed air network 8.

In order to optimize the adjustment of the flows and the selection of the suitable compressor 2-3-4, an algorithm is provided in the control box 28, in particular in the arithmetic unit 30, which compares the scores of all the control orders of all the compressors 2-3-4, either periodically or continuously, which would result in an appropriate flow variation so as to bring the pressure p closer to the target value PS.

Judging by this comparison, the algorithm decides what control order is to be actually carried out on the basis of the highest score, so that the most favorable solution is at all times selected.

If, for example, a flow increase can be obtained by means of a flow adjustment, both of the compressor 3 and of the compressor 4, the compressor 3-4 having the highest score will be selected.

Preferably, the algorithm, when selecting the most favorable control order, will also take into account the overall score of combined control orders of one or several compressors 2-3-4 which can direct the overall flow in the required direction, whereby this simple or combined control order is then carried out with the highest score.

In this manner is for example also reckoned with a combined control order whereby the flow of a single compressor, for example a compressor 2, is increased, while the flow of another compressor, for example of compressor 3, is simultaneously reduced in order to obtain an overall effect which brings the pressure P closer to the target pressure PS.

In order to select the most favorable control order, the above-mentioned scores of the control orders can be increased with a value which is equal to the difference between the supplied flow before the control order and the hypothetically supplied flow following the control order, as calculated by the algorithm, multiplied by a negative weighing factor.

If the value of the above-mentioned weighing factor is for example −1, a control order which would increase the flow with 50 units will then obtain a score −50, whereas a control order which would increase the flow with 30 units will obtain a more favorable score −30, such that when selecting the appropriate control orders, also the scope of the effect of a certain control order will be taken into account.

Preferably, when selecting the best control order, also what is called the flow deviation is taken into account, which is the difference between the supplied flow and the required flow after a hypothetic implementation of the control order concerned, which flow deviation can be calculated by the control box 28.

It is clear that a small flow deviation is judged as being more favorable than a large flow deviation.

In practice, it is found that a control order which results in a negative flow deviation is more favorable than a control order which implies a positive flow deviation.

The algorithm will take these data into account by giving an additional score to the control order concerned which is equal to the flow deviation, multiplied by a negative weighing factor whose absolute value is larger in the case where the above-mentioned difference is positive than in the case where this difference is negative.

According to a special characteristic of the invention, the control box 28 can be made to take into account, when selecting the control orders, that all the compressors must wear to the same extent.

This is realized by adding a value to the scores of the control orders which is equal to the number of working hours of the compressor 2-3-4 concerned, multiplied by a negative weighing factor.

Thus, a compressor with a large number of working hours will be penalized in relation to a compressor 2-3-4 with less working hours when selecting the algorithm.

In the same manner, a certain priority can be accorded to the control box 28 for the selection of the compressors 2-3-4, whereby a higher additional priority value will be accorded to certain compressors having priority, which is all the bigger as the required priority is higher.

Also a forced priority can be imposed when starting the compressors 2-3-4, by according a starting priority to every compressor which is added to the aforesaid scores of the control orders after multiplication with a negative weighing factor.

Thus, a compressor with starting priority 1 having the biggest priority will score less negatively than a compressor having a smaller starting priority 3.

It is clear that, in this manner, also other criteria and priorities than the ones described above can be imposed on the control box 28, and that it is also possible, for example, to build in a clock in the control box 28, such that when controlling the compressed air installation 1, also the working hours, weekends and the like are taken into account.

Such criteria and priorities can also be combined by adding up the above-mentioned scores, such that the algorithm will for example reckon with the output criterion as well as the wear criterion, whereby the importance attached to one or other criterion is determined by the weighing factor.

In this manner, the use of the compressed air installation 1 can be taken advantage of in a very simple and flexible manner, whereby the user can program the control box 28 as desired.

The control box can be programmed via the computer 31 or by means of a distant computer via the internet or the like.

Naturally, the control box 28 itself can also be equipped with a keyboard and a screen, such that the programming must not necessarily be done via a separate computer 31 in this case.

Figure 5:
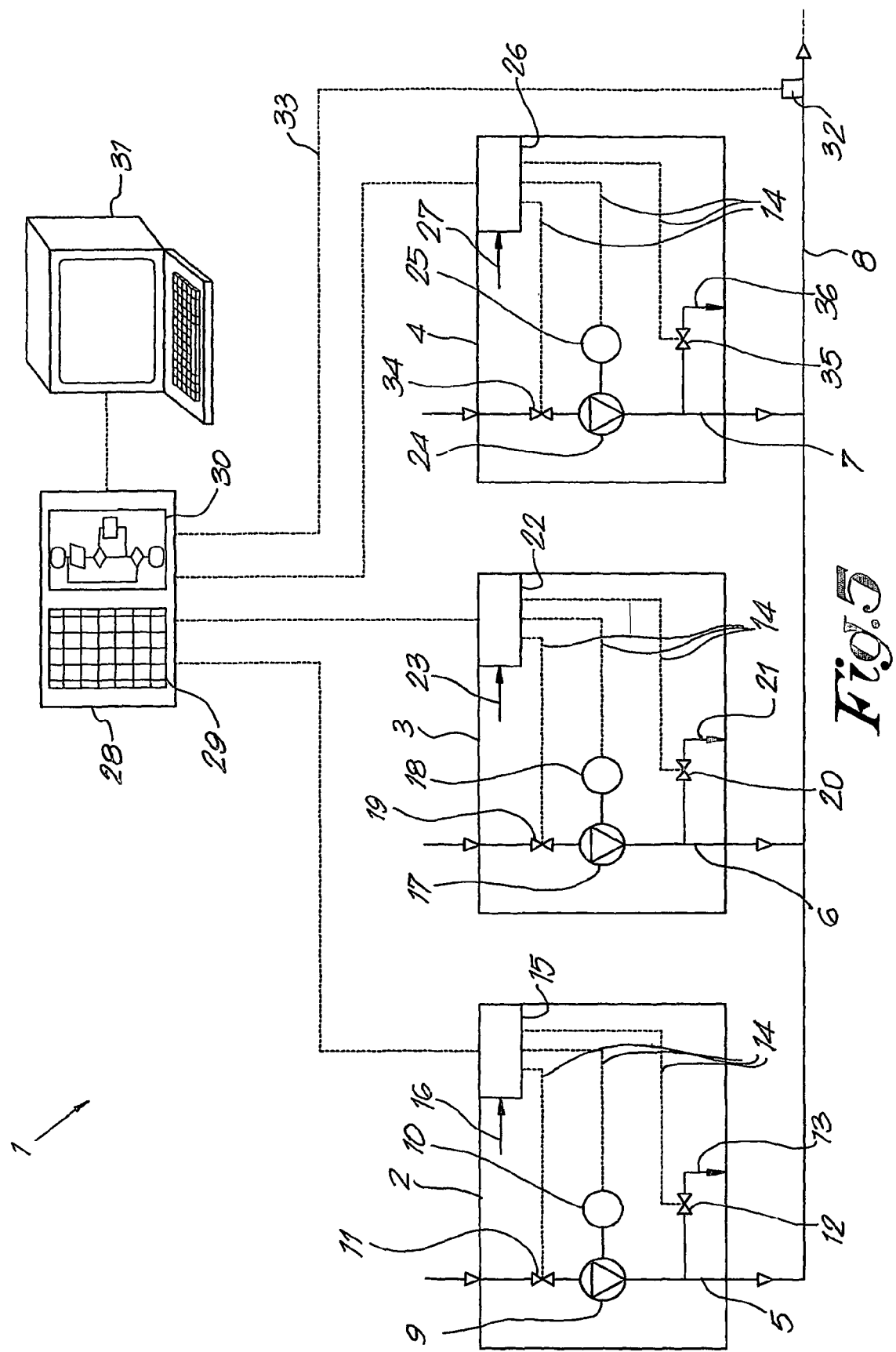
FIG. 5 represents a variant of FIG. 1.

FIG. 5 represents a variant of a compressed air installation 1 which differs in that, in this case, also the compressor 4 of the variable speed type is equipped with a controllable inlet valve 34 and a controllable exhaust valve 35 having a free exhaust 36 in the atmosphere, which inlet valve 34 and exhaust valve 35 are connected to the control element 26.

Naturally, these additional control units 34-35 can be controlled by the control box 28, such that the pressure in the compressed air network 8 can be adjusted even more precisely by setting the flows of the compressors 2-3-4.

Although, in the figures, the compressed air installation 1 comprises three compressors 2-3-4 of different types, it is not excluded that only one or two types of compressors are applied in the compressed air installation comprising several compressors.

Nor is it excluded that more than three compressors are applied in any combination whatsoever as far as used compressor types are concerned.

Nor is it excluded to combine the above-mentioned compressor types with compressors of the type having a modulating inlet or outlet of the partial-load type compressor, in any combination whatsoever.

Nor must the compressors be necessarily equipped with all the above-described control units (11-12-15-19-20-22-26-34-35), and, naturally, they can also be equipped with additional control units which can be either or not operated by the control box 28.

Although the figures always represent single-stage compressors, it is also possible for multi-stage compressors to be applied with several compressor elements connected to each other in series or in parallel.

It is clear that the invention can also be applied to other compressor installations which are used to compress other gases than air.

The invention is by no means limited to the above-described method, control box and compressed air installation described as an example; on the contrary, such a method, control box and compressed air installation can be made according to several variants while still remaining within the scope of the invention.

The invention claimed is:

1. Method for adjusting a compressed air installation with several compressors, said installation comprising two or more electrically driven compressors of the kind known as any of the designations: 'loaded/unloaded' compressor; turbo compressor; and variable rotational speed compressor, said compressors being connected to a single compressed air network via respective outlets thereof, and wherein each compressor is provided with at least one control unit, and further wherein a control box to which is connected a pressure sensor comprising part of said compressed air network is used, the method comprising:

using said control box to adjust the pressure in said compressed air network relative to a settable target pressure and within a pressure range which is limited by a minimum pressure to be set and a maximum pressure to be set, and wherein the adjustment takes place by controlling the flow of one or more of the two or more compressors in order to increase the overall flow supplied by the compressors when the pressure drops below a first desired level, and in order to lower the overall supplied flow when the pressure exceeds a second desired level; and storing an evaluation table in a memory of the control box beforehand for every compressor or for every type of compressor of the compressed air installation, such that for every working condition of the respective compressor, the influence of a control order is assessed, and such that for every control order of the compressor concerned, a score is given which is positive when the influence of said order is favourable to the output of the compressed air installation, and which is negative when the influence is unfavourable, and whose absolute value increases as the favourable or unfavourable influence increases.

2. Method according to claim 1, wherein the control box controls the overall flow of the compressed air installation by providing at least one given control order to the control unit of one or more of the two or more compressors, which given control order or given control orders may include one or more orders selected from the group consisting of starting and/or stopping one or more of the two or more compressors; opening or closing a controlled inlet valve of one or more of the two or more compressors; opening or closing an exhaust valve of one or more of the two or more compressors to a greater or lesser degree; and adjusting a rotational speed of one or more of the two or more compressors.

3. Method according to claim 1, wherein, while the compressed air installation is operational, in order to select a most favourable control order as determined by the scores assigned to the control orders, the scores of all positive control orders which can direct the overall flow in the required direction in order to bring the pressure in the compressed air network closer to the set target pressure, can be mutually compared by an algorithm, either periodically or continuously, after which the control order having the highest score assigned thereto is implemented.

4. Method according to claim 3, wherein the algorithm, when selecting the most favourable control order, also takes into account the overall score of combined control orders of one or several compressors which can direct the overall flow in the required direction, such that the control order or combined control order having the highest score is subsequently carried out.

5. Method according to claim 3, wherein in order to select the most favourable control order, the scores of the control orders are increased by a value which is equal to the difference between a supplied flow and a required flow after a hypothetic implementation of the control order concerned, multiplied by a negative weighing factor whose absolute value is bigger in the case where said difference is positive than in the case where said difference is negative.

6. Method according to claim 3, wherein in order to select the most favourable control order, the scores of the control orders are increased by a value which is equal to the difference between a supplied flow before the control order and a hypothetically supplied flow following the control order, multiplied by a negative weighing factor.

7. Method according to claim 3, wherein if an even wear is required for all the compressors, a value is added to the scores which is equal to the number of working hours of each respective compressor, multiplied by a negative weighing factor.

8. Method according to claim 3, wherein if a forced priority for starting the compressors is required, a starting priority is accorded to the compressors which is added to the above-mentioned scores after multiplication with a negative weighing factor.

9. Method according to claim 3, wherein if a low selection priority is required for a compressor, a positive value will be subtracted from the scores of the low selection priority compressor.

10. Control box for adjusting the compressed air installation comprising two or more compressors according to the method of claim 1, said control box comprising: connections to the at least one control unit of each compressor and to the pressure sensor of the compressed air installation, wherein said control box adjusts the pressure in said compressed air network relative to the settable target pressure and within the pressure range which is limited by the minimum pressure to be set and the maximum pressure to be set, and wherein the adjustment takes place by controlling the flow of one or more of the two or more compressors in order to increase the overall flow supplied by the compressors when the pressure drops below the first desired level, and in order to lower the overall supplied flow when the pressure exceeds the second desired level, and wherein the evaluation table is stored in the memory of the control box beforehand for every compressor or for every type of compressor of the compressed air installation, such that for every working condition of the respective compressor, the influence of the control order is assessed, and such that for every control order of the compressor concerned, the score that is given is positive when the influence of said order is favourable to the output of the compressed air installation, and is negative when the influence is unfavourable, and wherein the absolute value increases as the favourable or unfavourable influence increases; and an arithmetic unit with an algorithm which enables comparison between said given scores and to provide a given control order as a function of a highest selected score.

11. Compressed air installation for carrying out the method according to claim 1, comprising two or more compressors selected from the group of compressor types consisting of 'loaded/unloaded' compressor; turbo compressor; and variable rotational speed compressor, wherein the compressors are each connected to the single compressed air network via respective outlets thereof, and wherein each compressor is provided with the one or several control units; the pressure sensor; and the control box which is connected to one or several of the control units and to the pressure sensor.

* * * * *